Dec. 16, 1930.                L. C. MARTIN                1,785,038
           NOSE GUARD MOUNTING FOR SPECTACLES AND EYEGLASSES
                          Filed July 18, 1929
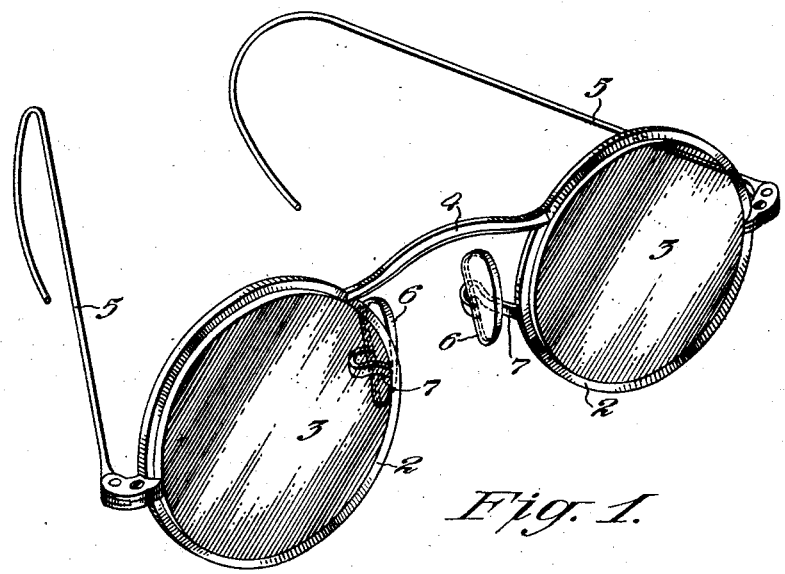
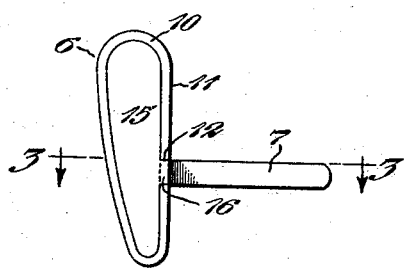
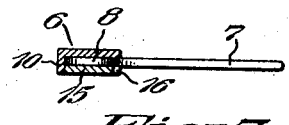
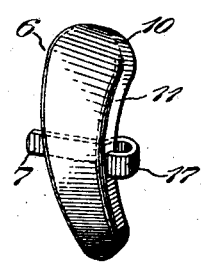
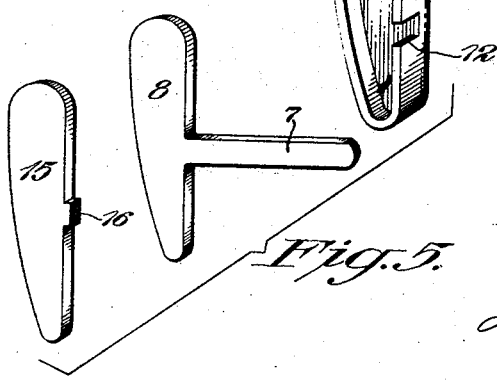
Inventor:
Laurence C. Martin
By
Pennington and White
Attorneys.

Patented Dec. 16, 1930

1,785,038

UNITED STATES PATENT OFFICE

LAURENCE C. MARTIN, OF PROVIDENCE, RHODE ISLAND, ASSIGNOR TO MARTIN-COPELAND COMPANY, A TRUSTEESHIP CONSISTING OF EDGAR W. MARTIN, OF BARRINGTON, RHODE ISLAND, LAURENCE C. MARTIN, OF PROVIDENCE, RHODE ISLAND, AND GEORGE W. BLEECKER, OF CHICAGO, ILLINOIS

NOSE-GUARD MOUNTING FOR SPECTACLES AND EYEGLASSES

Application filed July 18, 1929. Serial No. 379,215.

This invention relates to ophthalmic mountings, and particularly to an improved non-metallic nose-guard having means for attaching or affixing it to spectacle and eyeglass frames.

A principal object of the invention is to provide a non-metallic nose-guard adapted to be bent or formed by hand to shape it to the required contour to fit the nose of the wearer of the spectacles or eye-glasses.

Another object of the invention is to provide a non-metallic nose-guard so constructed and mounted on the arm which attaches it to the frame that it may be shaped into concavo-convex contour on its opposite sides without danger of splitting or breaking the non-metallic material or loosening it on its arm or support.

Another object of the invention is to provide a nose-guard possessing a smooth outer surface without irregularities or rough corners and somewhat resilient to prevent irritation or abrasion of the skin or flesh of the wearer of the spectacles or eyeglasses.

Another object of the invention is to provide a nose-guard and mounting therefor of neater and more finished appearance which is stronger and more durable in use and not liable to disconnection from the frame.

Another object of the invention is to provide a nose-guard having a more secure and permanent joinder between the guard itself and the supporting arm.

Further objects of the improvement are set forth in the following specification which describes a preferred form of construction of the invention as illustrated by the accompanying drawings. In the drawings:

Fig. 1 is a perspective view of a pair of spectacles showing the present improved nose-guard mounted on the frame;

Fig. 2 is an enlarged rear view of the improved nose-guard showing its arm or mounting;

Fig. 3 is a cross-sectional view of the guard taken on line 3—3 of Fig. 2;

Fig. 4 is a perspective view of the completed nose-guard shown as shaped to concavo-convex form and with its supporting arm bent around on its back in position to be attached to the spectacle or eyeglass frame; and Fig. 5 is a composite view in perspective illustrating the several parts of the improved nose-guard and its supporting means in disassembled relation.

It is at present the preferred practice to provide spectacle and eyeglass frames with nose-guards constructed from celluloid, zylonite or similar non-metallic material finished with a smooth outer surface to adapt them to fit against the sides of the nose without causing irritation or abrasion of the skin or flesh. Various methods have been devised for mounting such nose-guards on spectacle and eyeglass frames and the present invention contemplates an improvement therein by constructing the nose-guard as a hollow shell adapted to enclose or encase a suitable metallic core which is provided with a projecting arm for attachment to the rim of the frame. In the present invention the non-metallic shell or casing is placed over and cemented to the metal form or core on the end of the arm and provided with a cover which is fitted into place and cemented thereto, whereby to form a substantially continuous sheath for the metal part.

Referring to the drawings, Fig. 1 illustrates a conventional type of ophthalmic mounting in the form of a spectacle frame having rims 2 enclosing the lenses 3 and connected by a bridge 4. The frame 2 may be provided with temples 5 or, when used for eyeglasses, these may be dispensed with and a different form of nose-piece employed. In spectacle and eyeglass frames of latest type the bridge is not depended upon to support the glasses from the nose, but suitable nose-guards are provided for this purpose. Usually, the nose-guards 6 are mounted on wires or arms 7 projecting inwardly from the rims 2 and bent into suitable relation to adapt the guards to fit snugly against the sides of the nose. The arms 7 may be constructed in such form as to adapt them to be soldered or otherwise secured to the edge of the rims 2.

In the present invention the improved nose-guard comprises two essential elements, namely, the relatively slender arm 7 which may be either round or rectangular in cross-section and provided with an integral head or end-piece 8, preferably conformed substantially to the desired shape of the nose-guard. For enclosing the head or end-piece 8, I provide a non-metallic shell or casing 10 constructed of celluloid, zylonite or similar non-metallic material to adapt it to be cut from a sheet and pressed into shape or to be molded to the required form. The box-like casing 10 is of substantially lenticular outline in plan view with one end more pointed than the other and having a substantially straight side, indicated at 11, from which the arm-like mounting projects. The head or core 8 is of a form and size to adapt it to fit snugly within the shell or casing 10 and the side 11 of the latter is slotted at 12 to adapt the arm 7 to project therethrough.

A cover 15, shaped to the contour of the core 8, is fitted within the sides of the shell 10 in abutting relation with the flat side of the core. The cover 15 is provided on its straight side with a projection 16 adapted to be received within the slot 12 in the side of the shell 10 to close the end of the slot and conceal the joint where the arm 7 projects from the side of the nose-guard.

The several parts of the nose-guard are assembled by placing the head or core 8 within the shell or casing 10 with its arm 7 projecting through the slot 12 in the side thereof, the shell being first filled with suitable cement to secure the parts together. The cover 15 is then placed within the shell 10 and cemented to the flat side of the head or core 8 with the cement sealing the joint between its edges and the sides of the shell. Any suitable cement may be used for this purpose and preferably it is either transparent or colored to match the celluloid or zylonite shell 10 which may be white or of any other desired shade.

After the parts of the nose-guard have been assembled in the manner as above explained, its surface is polished and its edges rounded off to improve its smooth appearance, and in finishing the guard it may be slightly shaped to concavo-convex form along its length and across its width as indicated in Fig. 4 of the drawings. The arm 7 which projects from the side of the guard is bent around in a crook or gooseneck at 17 and extended rearwardly across the back of the guard to adapt the latter to be properly positioned on the spectacle or eyeglass frame when the end of the arm is soldered to the edge of the rim thereof as shown in Fig. 1.

The bending or concavo-convexing of the nose-guard is for the purpose of adapting it to fit the curve of the nose where it joins the face and with the present improved form of construction this bending or shaping of the guard may be accomplished very easily without danger of cracking or rupturing the shell or sheath which encloses the core 8. That is to say, with the present improved construction the pad or nose-guard proper is adapted to be shaped by the optician in fitting the glasses to different persons. The spectacle or eyeglass frame may be manufactured with its nose-guards having little or no concavo-convexity and the optician may provide the proper degree of convexity on the face of the pad which contacts with the nose by bending or compressing the guard between the jaws of concavo-convex pliers as usually provided for this purpose.

Such a method of fitting the nose-guards has heretofore been employed in some cases with metallic guards, but with previous types of non-metallic guards it is practically impossible to shape the pads without cracking or breaking them. With the present improved construction the non-metallic shell forms a pliant and easily bendable piece which may be shaped to the required form as occasion requires. In this way, spectacle or eyeglass frames provided with the present improved nose-guard are susceptible of being fitted to the wearer with a greater degree of accuracy to provide the proper contact with the nose while eliminating all discomfort and irritation due to improper conformation of the pads to the contour of the nose. Furthermore, the non-metallic sheath on the guard is somewhat resilient so that its pressure on the nose is less harsh than that of the usual type of guard.

In addition to the advantages set forth above, the present improved construction provides a nose-guard of neater and more finished appearance and one which is more durable in use and less liable of being broken or becoming detached from the frame to which it is applied.

While I have herein illustrated a preferred embodiment of the invention it is to be understood that modifications may be made in the form and construction of the parts of the device without departing from the spirit or scope of the invention as expressed in the accompanying claims.

I claim:

1. A nose-guard for ophthalmic mountings comprising a metallic member formed with a substantially flat head and an arm projecting therefrom for attachment to an eyeglass or spectacle frame, a non-metallic shell comprising a box-like portion enclosing one side and the edges of the head and provided with a slot in its side through which the arm projects, and a cover abutting the opposite side of the head and secured in place within the sides of the box to provide a smooth-surfaced resilient enclosure for that portion of the guard which contacts with the nose of the wearer of the eyeglasses or spectacles.

2. An ophthalmic mounting comprising a frame having rims for the lenses, nose-guards comprising metal arms secured to the rims of the frame at one end and formed with elongated heads at the opposite end, a shell having a box-like portion enclosing one side and the edges of the head, and a cover fitted within the sides of the box against the opposite side of the head with its edges cemented to the inner side walls of the box.

In testimony whereof I hereunto affix my signature.

LAURENCE C. MARTIN.